(12) United States Patent  
Beck et al.

(10) Patent No.: US 6,604,140 B1
(45) Date of Patent: Aug. 5, 2003

(54) SERVICE FRAMEWORK FOR COMPUTING DEVICES

(75) Inventors: James Edward Beck, Tarrytown, NY (US); Alain Franck Gefflaut, Elmsford, NY (US); Nayeem Islam, Bellevue, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/404,661

(22) Filed: Sep. 23, 1999

Related U.S. Application Data (60) Provisional application No. 60/127,225, filed on Mar. 31, 1999.

(51) Int. Cl.$^7$ .................................................. G06F 15/173
(52) U.S. Cl. ...................... 709/226; 709/201; 709/225; 709/229
(58) Field of Search .................... 709/100, 104, 709/201, 225, 226, 229, 300, 304, 310, 330, 331, 332

(56) References Cited

U.S. PATENT DOCUMENTS

| | | | | |
|---|---|---|---|---|
| 5,568,612 A | * | 10/1996 | Barrett et al. .............. | 709/203 |
| 5,758,077 A | * | 5/1998 | Danahy et al. ............. | 709/201 |
| 6,101,528 A | * | 8/2000 | Butt ........................... | 709/203 |
| 6,182,224 B1 | * | 1/2001 | Phillips et al. .............. | 713/201 |
| 6,209,036 B1 | * | 3/2001 | Aldred et al. ............... | 709/229 |
| 6,219,700 B1 | * | 4/2001 | Chang et al. ............... | 709/222 |
| 6,269,400 B1 | * | 7/2001 | Douglas et al. ............. | 709/224 |
| 6,286,047 B1 | * | 9/2001 | Ramanathan et al. ....... | 709/224 |
| 6,336,138 B1 | * | 1/2002 | Caswell et al. ............. | 709/223 |

\* cited by examiner

*Primary Examiner*—Saleh Najjar
(74) *Attorney, Agent, or Firm*—Louis P. Herzberg; David Aker (57) ABSTRACT

A method, apparatus and computer product that enables one or more computing devices to discover and use services over a network, which may be ad-hoc when the computing device is mobile. Service discovery is based on periodic multicasting of exported service descriptions to nearby devices over the (ad-hoc) network. Middleware enables a device to discover, advertise and use services. This enables software clients on the same device to share a service implementation (in the case of a local service) or to share an implementation proxy (in the case of a remote service). Each device being aware of the services (and service locations) that are currently available generally reduces the response time associated with accessing available services. While service descriptors are multicast and discovered, the service software is only downloaded on the device when the service is used. This enables economical resource management that is particularly useful for mobile devices.

75 Claims, 7 Drawing Sheets

SERVICE FRAMEWORK FOR COMPUTING DEVICES

This application claims priority from Provisional Application Ser. No. 60/127,225 which was filed on Mar. 31, 1999.

FIELD OF THE INVENTION

This invention relates to the field of computing. More specifically, it relates to the methods and means for allowing computing devices to discover and share software services in a distributed computing environment.

BACKGROUND OF THE INVENTION

As mobile and non-mobile computing devices become more prevalent, the need to share functionality and interact with other electronic devices increases. In isolation, such devices offer limited functionality because they have limited resources. Sharing is important, since it expands the functionality available to these devices.

Functionality is provided through the use of a service, which is an independent piece of software that performs a specific function on behalf of a client. By exchanging services, functionality is shared between devices. Service discovery refers to the process used by a device to find and load services on other devices.

Other approaches to service discovery have been described. However, many of these approaches are not suited for mobile and some non-mobile devices since they rely on a centralized server. The use of a centralized server is ill-suited for these devices because it impedes the use of ad-hoc networks, makes peer-to-peer interactions among devices more costly, is a single point of failure, and is difficult to correctly maintain state in highly dynamic environments.

Finally, since the bandwidth of a wireless network connection is inherently limited, a discovery mechanism is needed that wisely manages this resource. Existing approaches to service discovery waste bandwidth by using inefficient methods of describing services, loading services that are not used and duplicating service advertisements across devices.

DEFINITIONS

Ad-hoc network: a temporary network operating without the aid of any established infrastructure or centralized administration.

Advertised Service: a service that is available for discovery by other devices.

Application: a software program that is not a service but may use one or more services.

Software Client: a software program that uses one or more services.

Device: an entity that is capable of hosting applications and/or services

Discovered Service: a service that is acquired from another device.

Enhanced Service Descriptor: a Service Descriptor that includes information about the physical location of the service code.

Essential Service: a service that is essential for the proper operation of the device on which it is hosted.

Implementation Proxy: The portion of a remote service that resides and executes on the client device, and that communicates with the remote service implementation.

Lazy Loading: a term referring to the policy of loading the service implementation of a discovered service as late as possible to conserve device resources.

Local Service: a service that executes entirely on the device on which it is hosted.

Mobile Code: a term referring to a software program that can be transferred between devices over a network.

Multicast Messaging Protocol: a messaging protocol with a one-to-many relationship between senders and receivers.

Network Component: any computing device connected to a network.

Optional Service: a service that is not an essential service.

Period of Validity: the duration for which a discovered service may be available to clients on a device.

Remote Service: a service providing access to functionality on another device.

Remote Service Implementation: The portion of a remote service that resides and executes on another device, and that communicates with the implementation proxy.

Service: a software program that performs one or more well-defined functions on behalf of one or more clients.

Service Adapter: an entity that interposes between clients and a service implementation.

Service Binding: the process used by a client to associate a service lookup request with a service lookup response.

Service Descriptor: an entity that describes a service.

Service Discovery: the process used to locate and use services on other devices.

Service Framework: an entity that establishes the environment used to host and manage services.

Service Implementation: the software instructions associated with a service.

Service Lookup: the process used by a client to request a service on a device.

Service Registration: the process of making a service available to clients on a device.

Service Removal: the process of making a service unavailable to clients on a device Service Update: the process of replacing the service implementation of a service that is available to clients on a device.

SUMMARY OF THE INVENTION

It is therefore an aspect of the present invention to provide mobile and non-mobile devices with a method, apparatus or computer product to discover and use services in [ad-hoc] networks.

In a particular embodiment, middleware is provided that enables a device to use, discover and advertise services. Both the middleware and the services are advantageously written in Java, but the methods and means of using, discovering and advertising services could be applied in a different context.

In some embodiments, all software clients on the same device share a service implementation (in the case of a local service) or an implementation proxy (in the case of a remote service). Access to the service by a software client is generally restricted by a security policy. A security policy defines which services may be accessed by software clients on a device.

Another embodiment of the invention provides an article of manufacture comprising a computer usable medium having computer readable program code means embodied therein for effecting a method of the present invention.

In still another embodiment, the invention provides a computer program product comprising a computer usable medium having computer readable program code means embodied therein for causing a computer to effect a method of the present invention.

Still another embodiment the invention provides a program storage device readable by machine, tangibly embodying a program of instructions executable by the machine to perform method steps to effect a method of the present invention.

BRIEF DESCRIPTION OF THE DRAWINGS

These and other aspects, features, and advantages of the present invention will become apparent upon further consideration of the following detailed description of the invention when read in conjunction with the drawing figures, in which.

DESCRIPTION OF THE INVENTION

Figure 1:
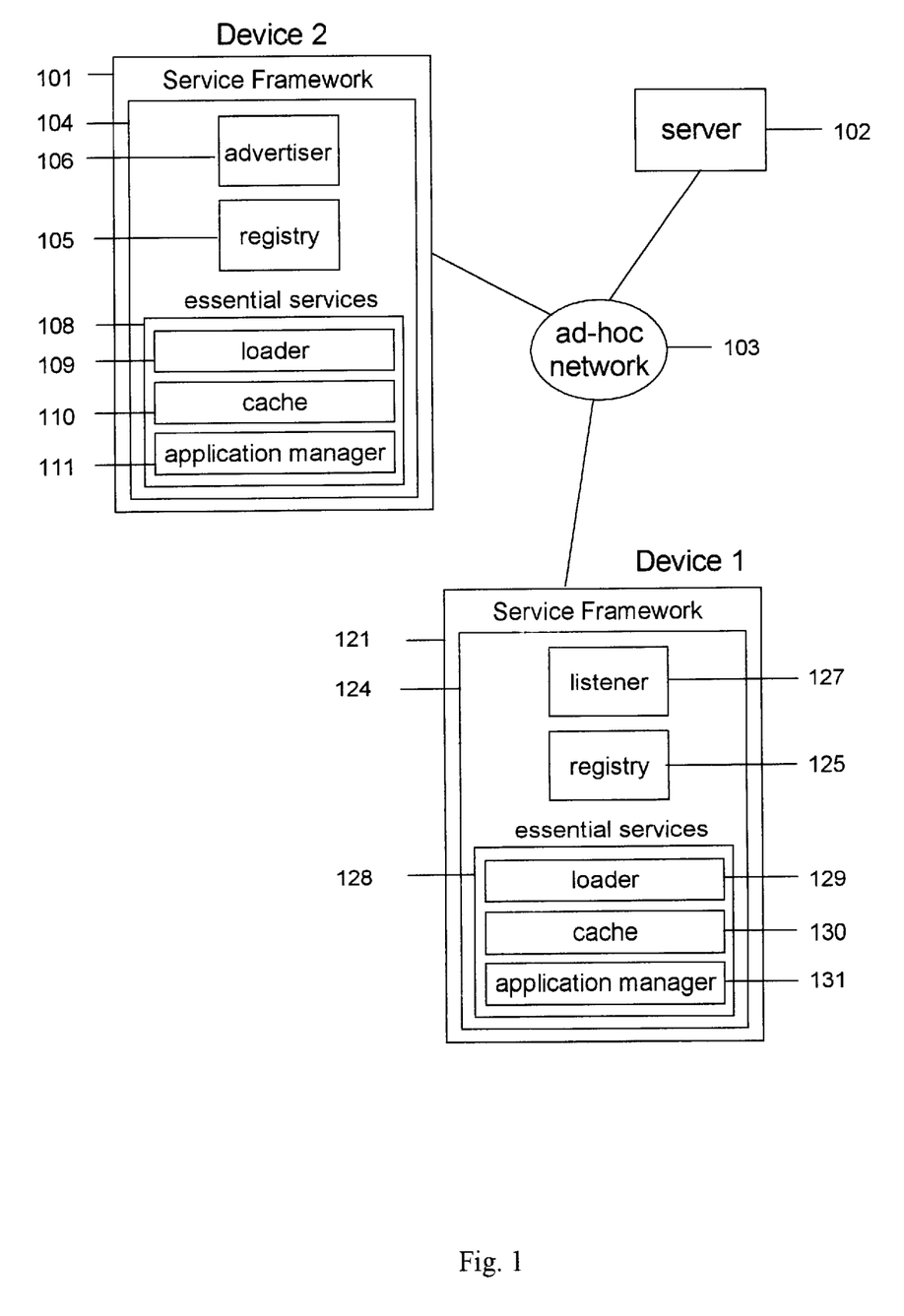
FIG. 1 shows an example of a system with a device in an ad-hoc network in accordance with the present invention.

The present invention provides methods and apparatus for mobile and non-mobile computing devices to discover and share software services in a distributed computing environment. A system suitable for use with the present invention is illustrated in FIG. 1. The system includes several computers, 101, 121 and 102, participating in an ad-hoc network, 103. Of these computers, two are mobile devices, 101 and 121. The mobile computers are hosting the Service Framework, 104 and 124, described by this invention. The third computer, 102, is a file server.

The mobile devices, 101 and 121 can be embodied, for example, by a personal digital assistant (PDA). The Service Framework on the mobile devices, 104 and 124, can be embodied, for example, by software written in the Java Language. The network, 103, can be embodied, for example, by bluetooth. The communication protocol is HTTP and TCP/IP with support for multicast messages. The server, 102, can be embodied, for example, by an IBM RISC System/6000 machine using AIX 4.2. Alternatively, the function of the server can be incorporated into one or both of the mobile devices, 101 or 121.

A logical organization can be placed on the physical system described above. In this organization, mobile devices have two distinct roles. The first role is a service advertiser, which announces the availability of services to other devices in the ad-hoc network. In FIG. 1, Device-2, 101 depicts a service advertiser. The second role is a service user, which hosts one or more clients that use one or more services on the device. In FIG. 1, Device-1, 121 depicts a service user. The system described in the present embodiment defines the operation of service providers and service users and the interactions between them. The interface to the server, 102, is unrestricted. The implementation of the ad-hoc network, 103, is unrestricted, aside from the need for a multicast messaging protocol and reasonable specifications of minimum bit rate and maximum latency. In the present embodiment, the system can consist of an arbitrary number of mobile devices, and each device can perform the role of service advertiser, service user, or both.

Each of the mobile devices is hosting the 'Service Framework', 104 and 124. The Service Framework provides the underlying software foundation for a device to advertise or use services. The Service Framework includes a registry, 105 and 125, which manages all of the services known to the device. Besides the registry, the Service Framework also includes essential services, 108 and 128. In the present embodiment, there are three essential services:

1. Loader (109), which provides support for loading services into the Service Framework;
2. Cache (110), which manages persistent storage for the Service Framework; and
3. Application Manager (111), which manages the applications that use services in the service framework.

Together, the registry and essential services provide the software environment for a device to use services. Besides the essential services, a device can host and use other services as well. These other services are called optional services, since the device can function with or without them. Examples of optional services in FIG. 1 include the advertiser, 106 and the listener, 127.

In FIG. 1, Device-2, 101 represents a service advertiser. Again, the role of a service advertiser is to announce the availability of services to other devices over the ad-hoc network. The service advertiser's registry, 105, includes information about all services known to the device, including the subset of services that the device wishes to advertise. Additionally, the service advertiser includes an advertiser, 106, that performs the advertisement function by interacting with the registry and executing the steps indicated in FIG. 2.

Figure 2:
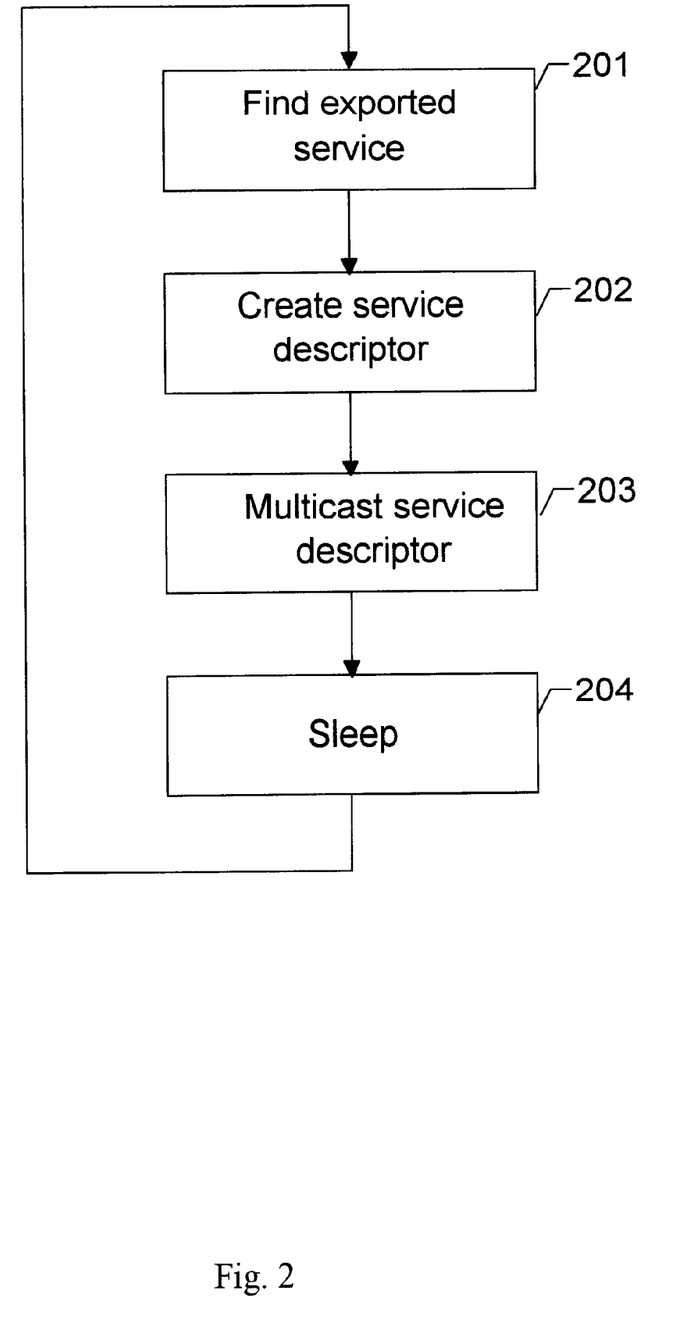
FIG. 2 shows an example of a flowchart for advertisement of services in accordance with the present invention.

FIG. 2 shows an example of a flowchart for advertisement of services in accordance with the present invention. In step 201, the advertiser retrieves a service that the device wishes to advertise. In the present embodiment, this operation is implemented by querying the service registry. In step 202, the advertiser creates a service descriptor. The service descriptor contains information about the service, including the service name and a description of its function. An enhanced service descriptor is a service descriptor that also contains the location of the code implementing the service. In the present embodiment, enhanced service descriptors are used and the service code location is provided as a URL. In step 203, the advertiser exports the service by multicasting the previously created service descriptor on a predefined multicast address over the ad-hoc network, 103. After sending the descriptor, the advertiser can, in step 204, sleep for a limited amount of time until a service (the same or another) has to be advertised. In the present embodiment, the advertiser is implemented as an optional service, and the sleep interval is set to 30 seconds. Depending on the application, sleep intervals may range from seconds to hours.

In FIG. 1, Device-1, 121 represents a service user. Again, the role of a service user is to host one or more clients that use one or more services on the device. The service user's registry, 125, includes information about all services known to the device, including services that are dynamically discovered. To discover services, the service user needs to receive service descriptors multicasted over the ad-hoc network by other devices. This function is performed by a listener, 127, which executes the steps indicated in FIG. 3.

Figure 3:
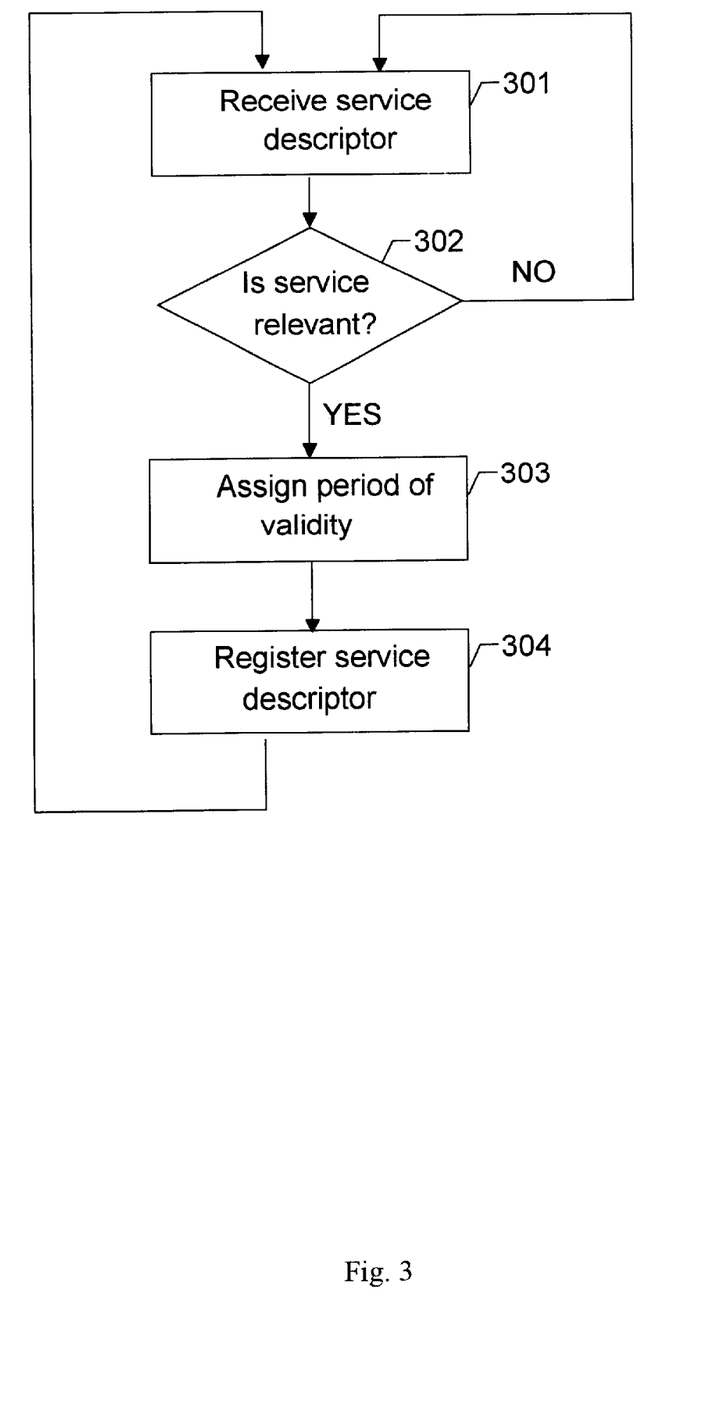
FIG. 3 shows an example of a flowchart for discovery of services in accordance with the present invention.

FIG. 3 shows an example of a flowchart for discovery of services in accordance with the present invention. In step 301, the listener receives a service descriptor by listening to the multicast channel. In step 302, the listener filters the incoming service descriptor by checking if it corresponds to a service that is relevant to the device. This check is performed according to a defined filtering policy indicating the relevance of services to the device. If the service descriptor is not relevant, the listener destroys the descriptor and waits for the arrival of a new descriptor. For example, a device not interested in using printer services could simply filter out any descriptor advertising a printer service. In step 303, if the service descriptor corresponds to a relevant service, a period of validity is assigned to the service descriptor. In step 304, the service descriptor is inserted into the registry with the associated period of validity. The discovered service is now available to all clients running on the device for the time interval specified by the period of validity, or until the service is removed via a removal command. By allowing both a removal command and a period of validity, services can be removed from the device via a combination of explicit (e.g. Removal command) and implicit (e.g. Expiration of period of validity) mechanisms. In the present embodiment, the period of validity is a time interval ranging from less than 10 seconds to more than 600 seconds.

Registering a service descriptor can be realized even if the descriptor is already registered. In such a case, the registration corresponds to a renewal of the validity period of the descriptor. Note also that discovering a service involves loading only a service descriptor, not loading the code that implements the service. In the current embodiment, the listener is implemented as an optional service, and the steps of advertising and listening can be repeated for more than one service.

Figure 4:
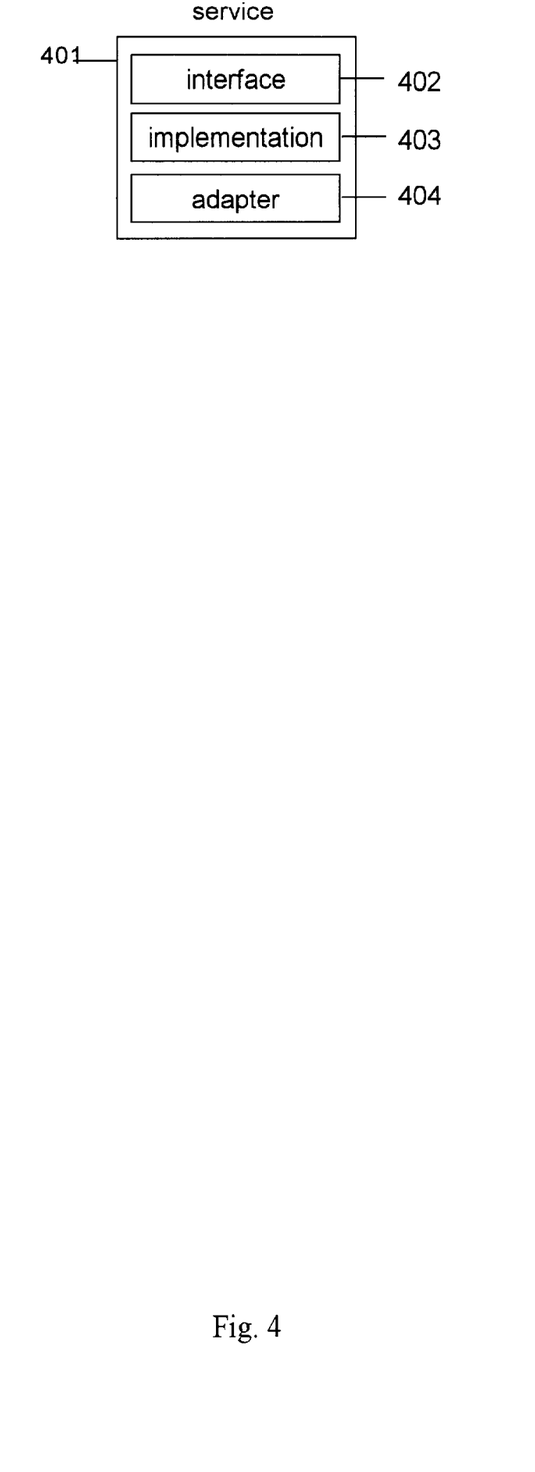
FIG. 4 shows an example of components of a service in accordance with the present invention.

FIG. 4 shows an example of components of a service in accordance with the present invention. In the example of FIG. 4, a service consists of three entities. These are: an interface, 402, an implementation, 403, and an adapter, 404. The first entity, the service interface, 402, defines the set of operations that the service can perform on behalf of a client. Consequently, the service interface is the contract shared between the service and its clients. In the present embodiment, the service interface is a Java interface. The second entity, the service implementation, 403, is the software instructions that perform the service's operation. In the present embodiment, the service implementation is a Java class. Note that there is a one-to-many relationship between service interfaces and service implementations. For instance, there is a single printer service interface, but there may be several printer service implementations, corresponding to printers from different manufacturers. The third and final entity, the service adapter, 404, interposes between the clients and the service. The service adapter provides an additional level of indirection between the clients and the service. Clients that use the service are granted access to the service adapter, while the service adapter provides access to the underlying service implementation. In the present embodiment, the service adapter is a Java class. Note that there is a one-to-one relationship between service adapters and service implementations; i.e. each service implementation has its own, unique adapter.

Before a client can use a service, the operations of lookup and binding need to occur. Lookup refers to the process used to request the appropriate service. Binding refers to the process of associating an entity with a service type that the client knows about.

Figure 5:
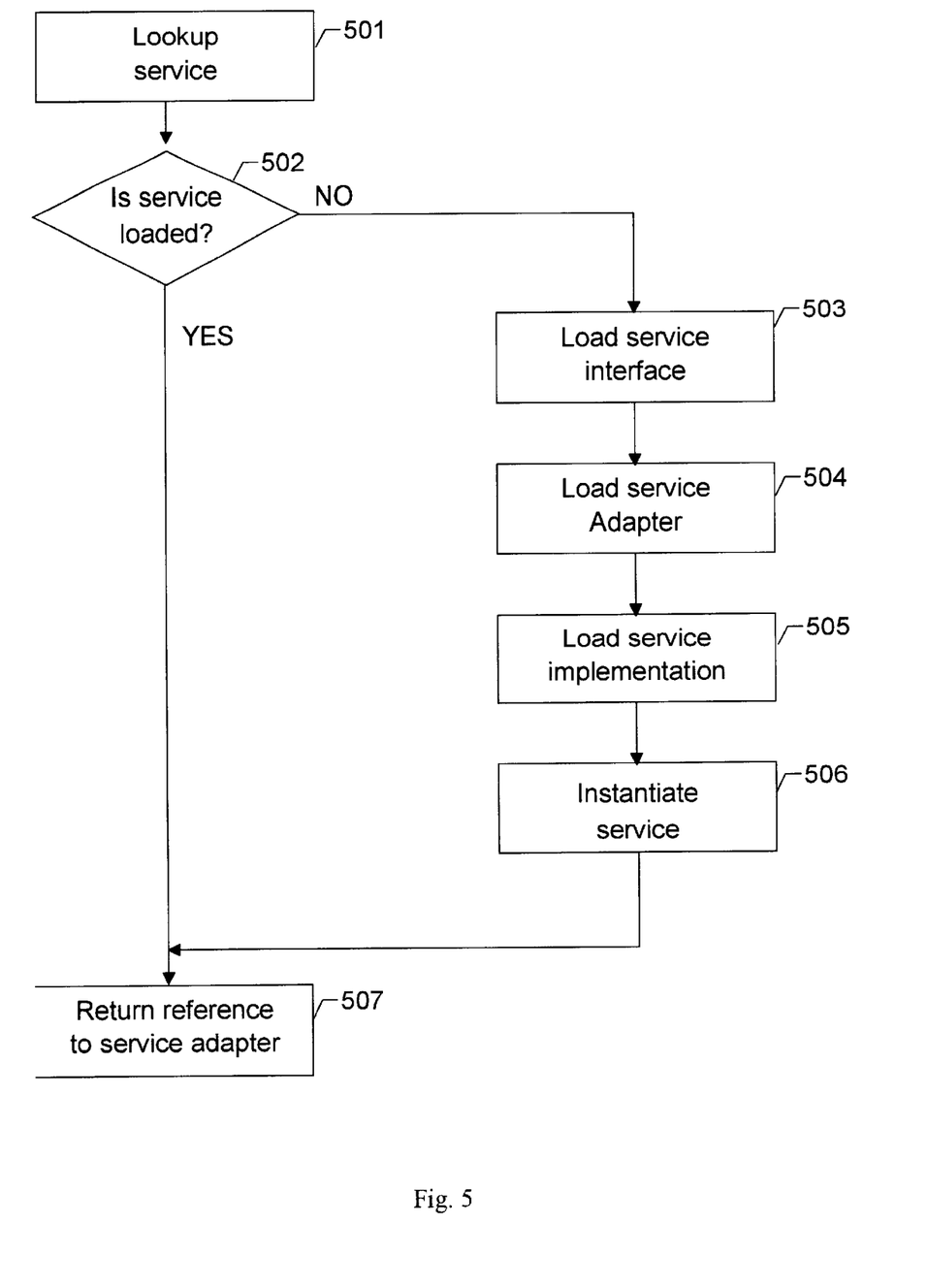
FIG. 5 shows an example of a method of service lookup and binding in accordance with the present invention.

FIG. 5 shows an example of a method of service lookup and binding in accordance with the present invention. In step 501, a client requests usage of a service by querying the service registry. In the present embodiment, the client furnishes a description of the requested service via attributes of the service interface and, optionally, the service implementation. The registry matches this request against descriptors of known services. If a service descriptor matches the description of the requested service, the registry follows in step 502 where it checks if the service is already loaded on the device. If the service is not loaded on the device, the service registry follows steps 503, 504 and 505 in order to respectively download the service interface, adapter and implementation. The process of deferring the downloading of the service code until a client actually requests the service is called lazy loading. The use of lazy loading minimizes consumption of device resources, because if a service is never used, the code for the service never gets loaded onto the device. In step 506, the service is instantiated and started. The process of binding a service terminates in step 507 where a reference to the service adapter is returned to the client.

Note that FIG. 5 does not show the case where no service descriptor matches the service description provided by the software client. In such a case, the service registry would simply return an error to the client, indicating that the service could not be located.

Figure 6:
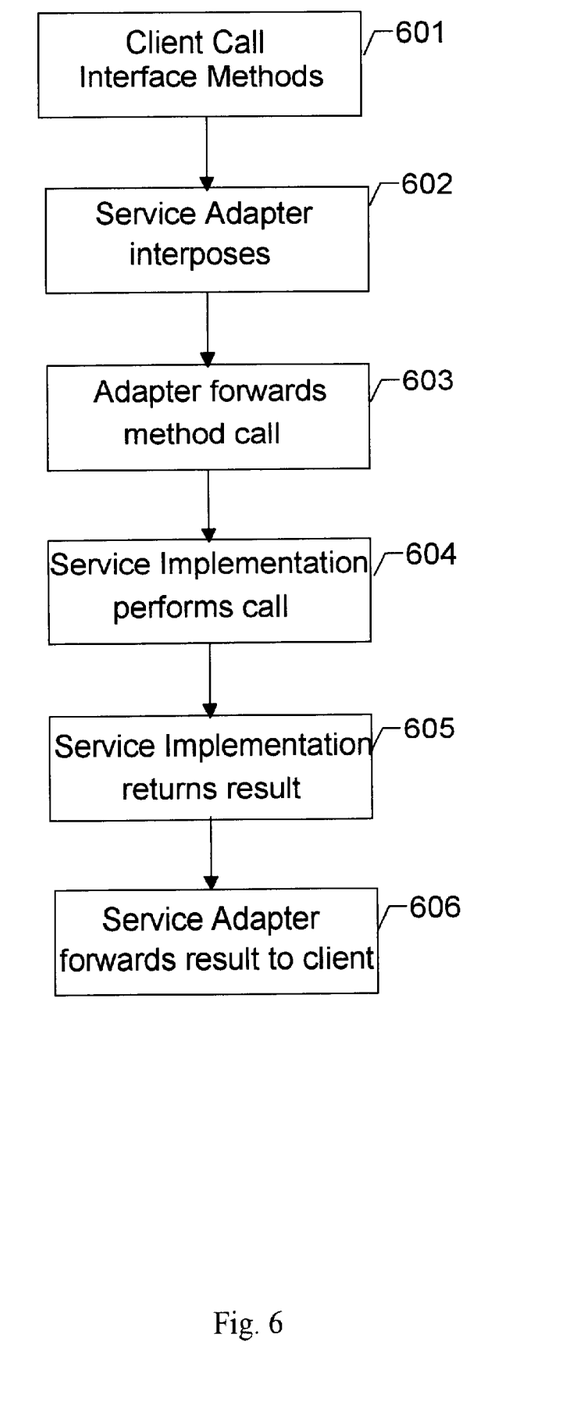
FIG. 6 shows an example of a method employed by a client to use a service in accordance with the present invention.

Once a client has bound a service it can use it by calling the methods that the service provides. FIG. 6 shows an example of a method employed by a client to use a service in accordance with the present invention. In step 601, the software client calls a method provided by the service's interface. Since the reference held by the software client is an instance of the service adapter, the method call is invoked on the service adapter as shown in step 602. After executing its function, the service adapter forwards, in step 603, the call to the service implementation. In step 604 the service implementation method is executed, wherein the service performs the requested function on behalf of the client. In step 605 the result of the service implementation method is returned to the service adapter method which forwards the result to the client in step 606.

The existence of a service adapter interposing between the client and the service implementation is transparent to the client. In some embodiments the service adapter has been proven useful by enabling a combination of the following utilities:

Dynamic update: allows the software for a service to be dynamically updated in a way that is transparent to clients.

Fine grain security: allows filtering and restriction of service access requests issued by a client.

Load balancing: allows a service to be composed of multiple copies, although the service appears as a single entity to the clients.

Hot swap of services: allows a service to be dynamically suspended, saved to persistent storage (e.g. disk, database, etc.) and later resumed, in a way that is transparent to clients. This function allows a device to minimize the active memory footprint.

Language independence: refers to the ability of allowing service implementations to be written in any arbitrary programming language.

Services on a device are available for use by multiple software clients on that device until the service's period of validity expires or a removal command is executed. Once this occurs, the entry describing the service is removed from the registry. This causes any future attempts to lookup the service to fail. Additionally, the service adapter is re-directed to an error handler, which causes any future use of the service by a client to return an error condition. In the present embodiment, garbage collection is used to dynamically remove the files associated with the service interface, adapter and implementation, once the service has been removed from the registry and clients no longer hold references to the expired service.

Up to now it has been assumed that a service executes locally on the device that uses the service. This type of service is called a local service, since execution is confined to the local environment of the device that hosts the service. However, it is also desirable to have remote services; that is, a service that executes on a device other than the one using it. For instance, a printer service can be a remote service, since execution may occur on the remote computer that manages the print spool, as well as on the device using the printer service. Another example would be using a PDA (Personal Digital Assistant), such as the palm pilot, to discover a remote service at an airport kiosk that communicates with an airlines on-line database to provide the user with updated flight information.

Figure 7:
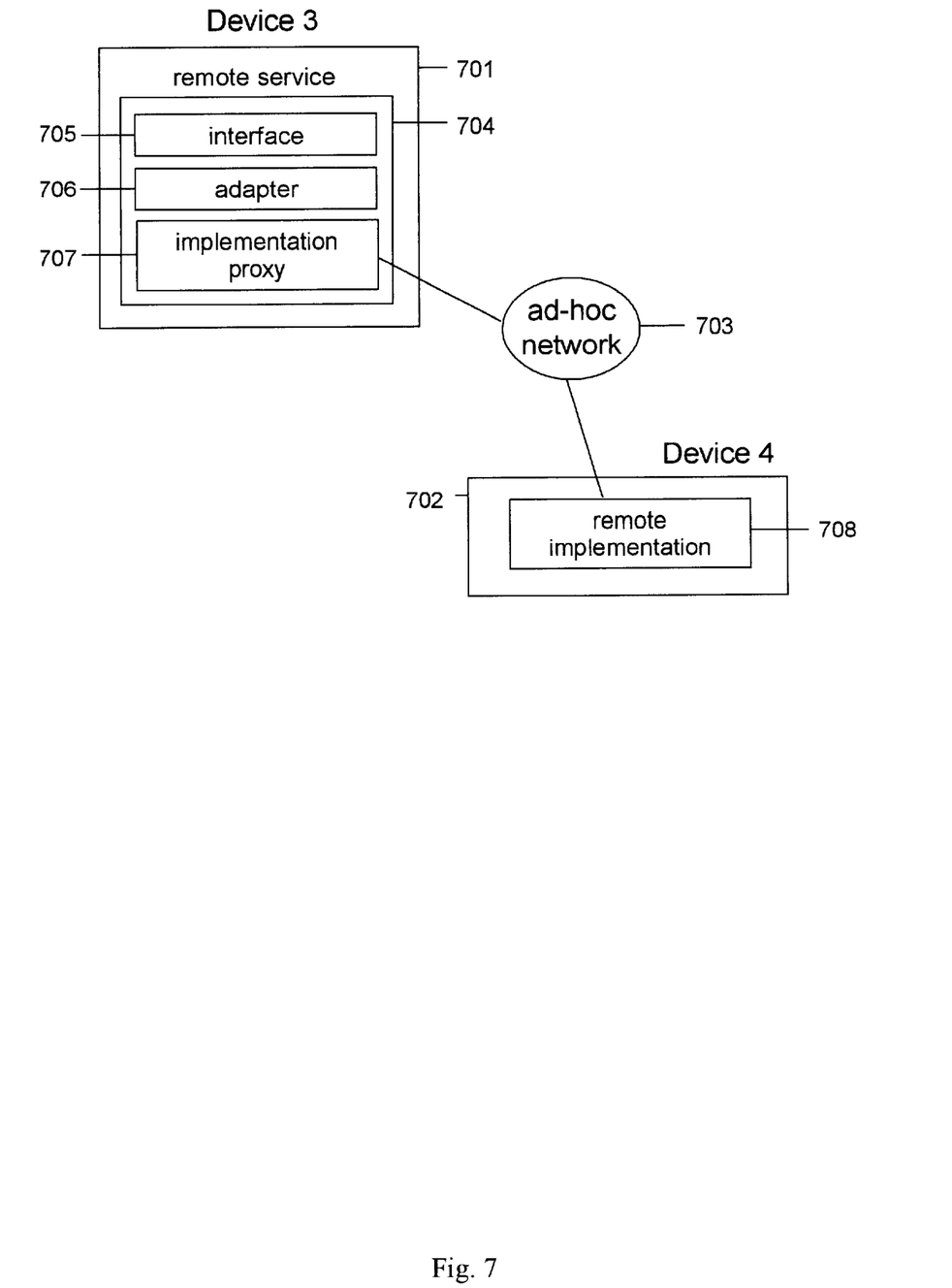
FIG. 7 shows an example of an embodiment of a remote service in accordance with the present invention.

FIG. 7 shows an example embodiment showing how a remote service is implemented in the present invention. In FIG. 7, Device-3, 701, again represents either a mobile device or a non-mobile device acting as a service user. In this case, Device-3 is using a remote service, 704. As mentioned before, a service consists of three entities: an interface, an adapter and an implementation. In the case of a remote service, the interface, 705, and adapter, 706, are unchanged. However, the service implementation is split into two parts. These are an implementation proxy, 707, and a remote service implementation, 708. The implementation proxy resides on the device using the service (Device-3, 701), while the remote service implementation resides on a remote device (Device-4. 702). The implementation proxy and remote service implementation cooperate with one another over the ad-hoc network, 703, to implement the service. Consequently, execution of the service can occur on either the device that uses the service (Device-3, 701), the remote device (Device-4, 702), or both.

Unlike a local service, the descriptor for a remote service also contains information about the location of the remote device. In the present embodiment, this is provided in the form of an IP address and a TCP port number.

In the present embodiment, the implementation of the remote device is unrestricted. The remote device could be a mobile or non-mobile device hosting the Service Framework, or any other type of machine. Likewise, the remote implementation is unrestricted, since it could be written in any language or exist in any framework. Finally, the protocol for communication between the implementation proxy and remote implementation is also unrestricted; in the present embodiment Java Remote Method Invocation (RMI) is used. Other example embodiments of the communication protocol between the implementation proxy and the remote service implementation include the Open Software Foundation Remote Procedure Call (OSF-RPC), and the Corba Internet Inter-ORB Protocol (IIOP).

Up to now it has been assumed that a mobile or non-mobile device acting as a service advertiser only advertises a subset of the services recorded in its registry; i.e. a subset of the services that the device knows about. However, the act of repeatedly advertising services consumes device resources. Consequently, in some circumstances, it may be desirable to allow a device acting as a service advertiser to first learn about and then advertise services on behalf of another device. In the present embodiment, this is easily realized, by dynamically adjusting the rate of service advertisement among devices hosting the Service Framework. Similarly, this support could be extended to any device, by providing a means by which a device could request another device to advertise services on its behalf. In an embodiment, a PC advertises a printing service on behalf of a printer that resides in the same office. Also, a device that is powered by an AC electrical outlet, like a PC, may be used to advertise services on behalf of battery powered devices, like PDAS, cell phones or two-way pagers, in order to minimize energy consumption and maximize battery life.

In the present embodiment, the life-cycle of services is managed by the registry. Specifically, this includes the following functions: service registration, service lookup, service binding, service removal and service update. Service Registration refers to the process of making a service available to clients on a device. Service Lookup refers to the process used by a client to request a service. Service Binding refers to the process used to resolve a service lookup request to a reference of a service adapter. Service Removal refers to the process of making a service unavailable to clients on a device. Finally, Service Update refers to the process of replacing a service's implementation with a new one.

In some embodiments, all software clients on the same device share a service implementation (in the case of a local service) or an implementation proxy (in the case of a remote service). Access to the service by a software client is generally restricted by a security policy. A security policy defines which services may be accessed by software clients on a device. An example of a security policy is one that restricts software clients that were downloaded from remote machines from accessing any services that provide write access to nonvolatile storage on the device. In the present embodiment, the security policy is specified by the device owner. Moreover, the policy is enforced by two mechanisms. First, inaccessible services are hidden from a software client by removing these names from the set of named services known to the client. In an embodiment using Java, this is realized via the implementation of a class loader associated with the software client. While this provides coarse grained enforcement, finer-grained enforcement is achieved through the use of service adapters, which allows a service to specify precisely which clients may access a given interface method.

Note that in a present embodiment, a single device performs both the advertiser and the listener roles. This implies that a single device can advertise services to nearby devices, and also discover and use services advertised by nearby devices. For example, a mobile phone can advertise a remote messaging service to a neighboring PDA, and concurrently discover and use an address book service advertised by the PDA.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out, or cause the carrying out of these methods.

Computer program means or computer program in the present context mean any expression, in any language, code or notation, of a set of instructions intended to cause a system having an information processing capability to perform a particular function either directly or after either or both of the following:

1. conversion to another language, code or notation; and/or
2. reproduction in a different material form.

It is noted that the foregoing has outlined some of the more pertinent objects and embodiments of the present invention. The concepts of this invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art. Thus, it should be understood that the embodiments has been provided as an example and not as a limitation. The scope of the invention is defined by the appended claims.

Having thus described our invention, what we claim as new and desire to secure by Letters Patent is as follows:

1. A method for a first device to discover at least one service available from a second device, said method comprising:

said first device listening for availability of at least one service from said second device;

said second device advertising availability of said at least one service and providing an enhanced service descriptor for said at least one service, said enhanced descriptor providing information regarding the location of code for implementing said at least one service;

said first device receiving said at least one service descriptor; and implementing lazy loading for said at least one service, including loading code for said at least one service when said at least one service is referenced by said first device.

2. A method as recited in claim 1, further comprising employing multicast messaging protocol.

3. A method as recited in claim 1, wherein the step of listening includes employing an optional service.

4. A method as recited in claim 1, further comprising employing the Java language.

5. A method as recited in claim 1, wherein said at least one service is code running on the second device.

6. A method as recited in claim 1, further comprising said first device and said second device participating in an ad-hoc network.

7. A method as recited in claim 1, wherein said service descriptor is an enhanced descriptor.

8. A method as recited in claim 1, further comprising running the code for said at least one service.

9. A method as recited in claim 8, further comprising removing said service descriptor of said at least one service upon receiving a removal command.

10. A method as recited in claim 9, wherein said removal command is in response to lapse of a period of validity.

11. A method as recited in claim 1, wherein the step of advertising is performed repetitively.

12. A method as recited in claim 1, wherein the step of advertising includes said second device creating the service descriptor for at least a particular service to be advertised by said second device.

13. A method as recited in claim 1, further comprising said second device creating the service descriptor for at least one discovered service.

14. A method as recited in claim 1, wherein said at least one service is a remote service.

15. A method as recited in claim 1, wherein the step of receiving includes accepting and storing the service descriptor for said at least one service.

16. A method as recited in claim 15, further comprising determining a period of validity for said service descriptor for said at least one service.

17. A method as recited in claim 16, wherein the period of validity is a defined time interval.

18. A method as recited in claim 17, wherein the time interval is 10 seconds.

19. A method as recited in claim 14, wherein said service descriptor includes a physical location of said remote service.

20. A method as recited in claim 19, wherein said physical location comprises at least an IP address.

21. A method as recited in claim 20, further comprising employing Java Remote Method Invocation for implementing said at least one service.

22. A method as recited in claim 1, further comprising employing said second device for advertising said at least one service on behalf of a third device.

23. A method as recited in claim 22, wherein said third device is a printer.

24. A method as recited in claim 23, wherein said second device is a PC connected to said third device.

25. A method as recited in claim 1, further comprising repeating the steps of advertising and receiving for at least one other service included in said at least one service.

26. A method as recited in claim 25, further comprising said first device employing said at least one service and said at least one other service.

27. A method as recited in claim 1, further comprising said first device providing the capability of said second device to another device.

28. A method as recited in claim 1, wherein said at least one service is associated with a plurality of applications on said first device.

29. A method as recited in claim 28, further comprising said first device operating by employing only a single copy of said at least one service.

30. A method as recited in claim 1, further comprising employing a service adapter between said at least one service and at least one application.

31. A method as recited in claim 30, wherein said service adapter enables a utility selected from the group consisting of: security functions, updating functions, load balancing functions, hot swap functions, language utility, and any combinations of these utilities.

32. A method as recited in claim 1, further comprising filtering said service descriptor.

33. A method as recited in claim 32, wherein said step of filtering includes ignoring at least one particular service descriptor in accordance with a filtering policy.

34. A method as recited in claim 1, further comprising implementing life-cycle management of said at least one service.

35. A method as recited in claim 34, where in said life-cycle management performs a function selected from a group consisting of: registration, lookup, binding, removal, update, and any combinations of these functions.

36. A method for a first device to discover at least one available service, said method comprising:
employing a service framework defining and providing life-cycle management of at least one service running on at least a single device by:
distributively discovering at least one desired service from said at least one service among devices in an ad-hoc network, said desired service providing an enhanced discriptor, said enhanced descriptor providing information regarding the location of code for implementing said at least one service; and
implementing lazy loading for said at least one service, including loading code for said at least one service when said at least one service is referenced by said first device.

37. A method as recited in claim 36, further comprising dynamically downloading information regarding said desired service.

38. A method as recited in claim 36, wherein at least a particular service included in said at least one service is remote.

39. A method as recited in claim 36, wherein said at least one service has an associated period of validity.

40. A method as recited in claim 36, wherein said at least one service is usable by a plurality of applications on said single device.

41. A method as recited in claim 36, wherein said at least one service includes a service adapter and a service implementation.

42. A method as recited in claim 41, wherein said service adapter is used to dynamically update said service implementation.

43. A method as recited in claim 36, wherein said at least one desired service is a service discovered and advertised by a second device.

44. A method as recited in claim 36, wherein said at least one desired service is provided by a network component.

45. A system for a first device to discover at least one service available from a second device, said system comprising:
second device advertising means advertising availability of said at least one service and providing an enhanced service descriptor for said at least one service, said enhanced descriptor providing information regarding the location of code for implementing said at least one service;
first device listening means for discovering availability of said at least one service and for receiving said at least one service descriptor; and
means for implementing lazy loading for said at least one service, including means for loading code for said at least one service when said at least one service is referenced by said first device.

46. A system as recited in claim 45, further comprising means for employing a multicast messaging protocol.

47. A system as recited in claim 45, wherein the first device listening means includes means for employing an optional service.

48. A system as recited in claim 45, further comprising means for employing the Java language.

49. A system as recited in claim 45, wherein said at least one service is code running on said second device.

50. A system as recited in claim 45, further comprising said first device and said second device participating in a network.

51. A system as recited in claim 45, further comprising means for running code for said at least one service.

52. A system as recited in claim 51, further comprising means for removing said service descriptor of said at least one service upon receiving a removal command.

53. A system as recited in claim 45, wherein the second device advertising means performs advertising according to an advertising policy.

54. A system as recited in claim 45, wherein said at least one service includes a local service.

55. A system as recited in claim 45, wherein the first device listening means includes means for accepting and storing the service descriptor.

56. A system as recited in claim 45, wherein said second device advertises said at least one service on behalf of a third device.

57. A system as recited in claim 56, wherein said third device is a PDA.

58. A system as recited in claim 45, further comprising second device listening means co-located with said second device advertising means, said second device listening means for discovering availability of at least one particular service from another device.

59. A system as recited in claim 58, wherein said another device is said first device.

60. A system as recited in claim 58, further comprising first device advertisement means co-located with said first device listening means, said first device advertisement means for advertising availability of at least one specific service from a specific device.

61. A system as recited in claim 60, wherein said specific device is said second device.

62. A system as recited in claim 45, further comprising a first device service adapter coupled between said at least one service implementation and at least one application included in said first device.

63. A system as recited in claim 62, wherein said service adapter enables a utility taken from the group consisting of: security functions, updating functions, load balancing functions, hot swapp functions, language utility and any combinations of these utilities.

64. A system as recited in claim 45, further comprising filtering means for filtering said service descriptor.

65. A system as recited in claim 45, further comprising means for implementing life-cycle management of said at least one service for performing a function from a group consisting of: registration, look-up, binding, removal, update and any combination of these functions.

66. An apparatus comprising:
a service framework module which includes:
a listener service module to discover at least one service available from a first device and to receive an enhanced descriptor for each said at least one service, said enhanced descriptor providing information regarding the location of code for implementing said at least one service;
a service registry to store each said descriptor; and
means for implementing lazy loading for said at least one service, including means for loading code for said at least one service when said at least one service is referenced by said first device.

67. A system as recited in claim 66, further comprising an application manager to manage a life cycle of at least one application which employs one service included in said at least one service.

68. An apparatus comprising a service framework module which includes an advertising module to advertise said at least one service for the listener module of claim 66.

69. An article of manufacture comprising a computer usable medium having computer readable program code means embodied therein for causing a first device to discover at least one service available from a second device, the computer readable program code means in said article of manufacture comprising computer readable program code means for causing a computer to effect:

said first device listening for availability of at least one service from said second device;

said second device advertising availability of said at least one service and providing an enhanced service descriptor for said at least one service, said enhanced descriptor providing information regarding the location of code for implementing said at least one service;

said first device receiving said at least one service descriptor; and implementing lazy loading for said at least one service, including loading code for said at least one service when said at least one service is referenced by said first device.

70. An article of manufacture as recited in claim 69, wherein said service descriptor is an enhanced descriptor.

71. An article of manufacture as recited in claim 69, the computer readable program code means in said article of manufacture further comprising computer readable program code means for causing a computer to effect implementing lazy loading for said at least one service.

72. A computer program product comprising a computer usable medium having computer readable program code means embodied therein for causing a first device to discover at least one available service, the computer readable program code means in said computer program product comprising computer readable program code means for causing a computer to effect:

employing a service framework defining and providing life-cycle management of at least one service running on at least a single device;

distributively discovering at least one desired service from said at least one service among devices in an ad-hoc network, said service having an enhanced descriptor associated with said service, said enhanced descriptor providing information regarding the location of code for implementing said at least one service; and implementing lazy loading for said at least one service, said lazy loading including loading code for said at least one service when said at least one service is referenced by said first device.

73. A program storage device readable by machine, tangibly embodying a program of instructions executable by the machine to perform method steps for a first device to discover at least one service available from a second device, said method steps comprising:

said first device listening for availability of at least one service from said second device;

said second device advertising availability of said at least one service and providing an enhanced service descriptor for said at least one service, said enhanced descriptor providing information regarding the location of code for implementing said at least one service;

said first device receiving said at least one service descriptor; and implementing lazy loading for said at least one service, including loading code for said at least one service when said at least one service is referenced by said first device.

74. A program storage device readable by machine as recited in claim 73, said method steps further comprising running the code for said at least one service.

75. A program storage device readable by machine as recited in claim 74, said method steps further comprising removing said service descriptor of said at least one service upon receiving a removal command.

* * * * *